United States Patent [19]
Heath

[11] 4,108,395
[45] Aug. 22, 1978

[54] PRESSURE-FREE SEAT BELT RETRACTOR

[75] Inventor: Robert Boyson Heath, Adelaide, Australia

[73] Assignee: Rainsfords Metal Products Proprietary Limited, Australia

[21] Appl. No.: 717,488

[22] Filed: Aug. 25, 1976

[30] Foreign Application Priority Data

Aug. 26, 1975 [AU] Australia .................... 2923/75

[51] Int. Cl.² ............... A62B 35/00; B65H 75/48
[52] U.S. Cl. ................................. 242/107.7
[58] Field of Search .......... 242/107.6, 107.7, 107.4 R, 242/107.4 E; 297/388; 280/744–747

[56] References Cited

U.S. PATENT DOCUMENTS

| 3,491,966 | 1/1970 | Curran et al. | 242/107.6 X |
|---|---|---|---|
| 3,682,412 | 8/1972 | Kusynski | 242/107.6 X |
| 3,700,184 | 10/1972 | Francis | 242/107.6 X |
| 3,834,646 | 9/1974 | Heath | 242/107.7 |
| 3,858,826 | 1/1975 | Sprecher | 242/107.7 |
| 3,869,008 | 3/1975 | Sprecher | 242/107.6 X |

Primary Examiner—Harvey C. Hornsby
Assistant Examiner—John M. Jillions
Attorney, Agent, or Firm—Jay L. Chaskin

[57] ABSTRACT

A pressure-free type seat belt retractor wherein the wearer has a large "degree of freedom", i.e., permitting movement for a considerable distance beyond a "pressure-free point" without resetting so as to require retraction and subsequent withdrawal of the belt. A gate member, in the form of a disc is driven by a clutch from the retractor spool, is cooperable with a gate latch. The gate member has a cam surface which cooperates with a pawl so as to inhibit retraction after (1) withdrawal of the belt has caused the gate latch to engage the gate member and restrain its rotation; (2) initial retraction of the belt has released the latch from the member, and (3) further withdrawal has allowed the pawl to move to a retraction inhibiting position and establishing the "pressure-free point." The cam surface may again lift the pawl from the inhibiting position as belt withdrawal occurs, but upon subsequent retraction the pawl returns to the inhibiting position. The gate member is geared to rotate at a lower speed than the spool providing a larger "degree of freedom" without requiring resetting of the "pressure-free point."

15 Claims, 7 Drawing Figures

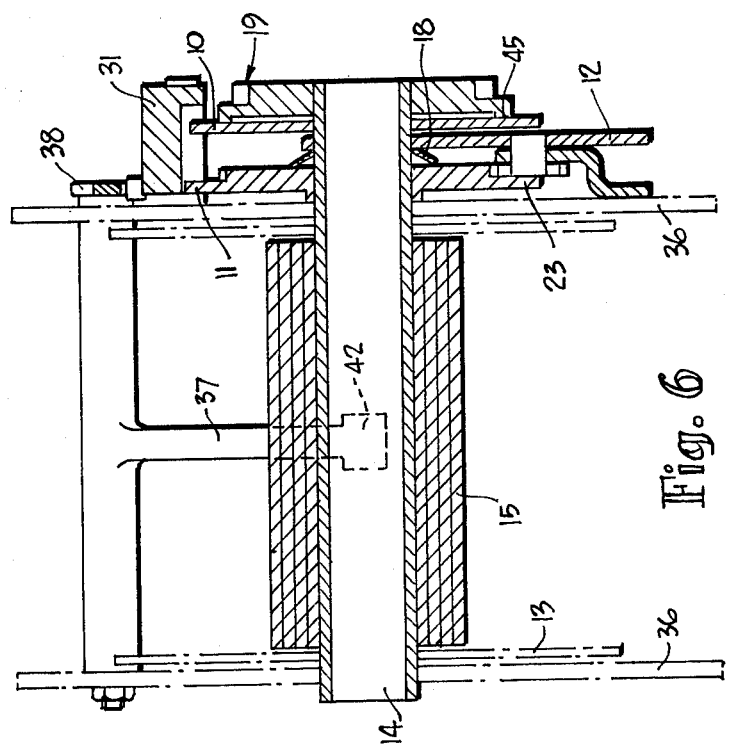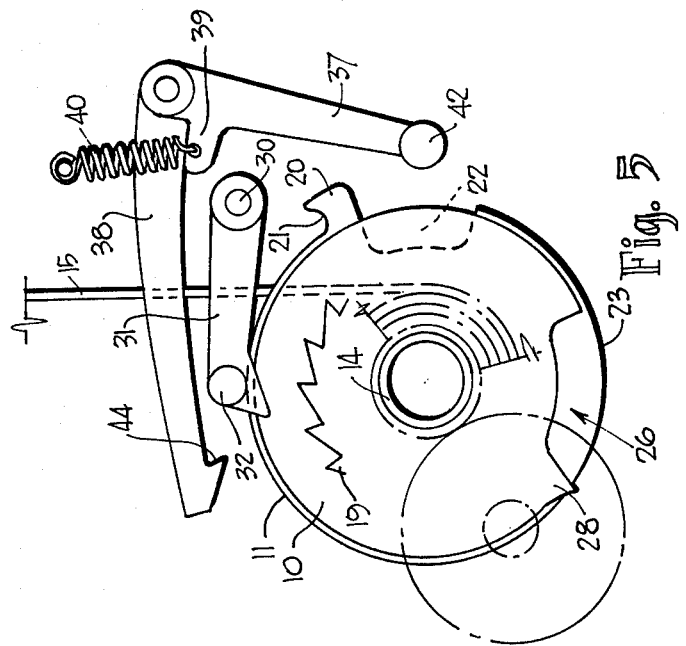

PRESSURE-FREE SEAT BELT RETRACTOR

This invention relates to a seat belt retractor for the retraction of a seat belt of a motor vehicle, and is specifically directed to a pressure free device having a large "degree of freedom", that is, having features which allow a user to move considerable distance beyond the "pressure free point" without resetting the device so as to require retraction and subsequent withdrawal of the belt.

BACKGROUND OF THE INVENTION

In U.S. Pat. No. 3,834,646, now U.S. Pat. No. Re. 29095, there is described and claimed a take-up spool latch which included an arrangement whereby a wearer was relieved from pressure otherwise applied to his body by the biasing effect of the take-up spool spring. Briefly this was achieved by means of a pawl which engaged a ratchet wheel carried on the spool on which a seat belt was coiled by a torsion imparting spring, and the arrangement was such that upon retraction of a seat belt which had already been withdrawn from the spool, cam surfaces pivoted the pawl out of engagement with the ratchet teeth; upon further initial withdrawal the pawl was released by the cam surfaces to engage the ratchet teeth, and upon still further withdrawal the cam surfaces again engaged the pawl to pivot it out of engagement with the ratchet teeth. The above described arrangement has been particularly successful and a slight variation of the arrangement described in the preferred embodiment which accompanied the application has proved commercially valuable.

The main objection which has been raised against the otherwise successful arrangement however, has been the limited amount of forward movement available to a seat belt wearer without losing the established pressure-free position, and further that a pressure-free condition can be accidentally established substantially away from the normal wearing position by certain body movements.

The main object of this invention is to provide a retractor wherein the seat belt wearer will have further freedom of movement beyond the "pressure-free point" established when a seat belt is allowed to retract so as to engage the body of the wearer.

BRIEF SUMMARY OF THE INVENTION

Briefly in this invention use is made of a gate member driven by a clutch from the retractor spool, and co-operable with a gate latch, the gate member having a cam surface thereon which co-operates with a retraction inhibiting member so as to inhibit retraction after:

(a) withdrawal of a belt has caused the gate latch to engage the gate member and restrain its rotation, (b) initial retraction of the belt has released the latch from the member, and (c) further withdrawal has allowed the retraction inhibiting member to move to a retraction inhibiting position at which retraction is inhibited.

By this invention, the "pressure free point" is established when the inhibiting member is allowed to move to its inhibiting position. The cam surface may be such as to again lift the inhibiting member from its inhibiting position as withdrawal takes place (as a wearer moves forward), but upon subsequent retraction the inhibiting member again drops into its inhibiting position. If the gate member is geared to rotate at a lower speed than the spool, a very large "degree of freedom" can be established without resetting of the "pressing free point" being required, although the pressure free condition will exist only for that movement which takes place while the inhibiting member is in its inhibiting position.

Specifically, one aspect of the invention comprises inhibiting means coupled to the spool, and a retraction inhibiting member movable with respect to the frame and releasably engageable with said inhibiting means to inhibit said rotation in the belt retraction direction, a gate latch moveable with respect to the frame, a gate member mounted for rotation with respect to the frame and coupled by clutch means to said spool, and having associated therewith both a cam surface engaged by said inhibiting member, and a gate latch engagement surface engageable by said gate latch to restrain gate member rotation in a latch restrained position upon belt withdrawal, and gate latch release means operable to release said latch from its engagement with said engagement surface when the gate member rotates upon belt retraction, said cam surface controlling said inhibiting member to engage said inhibiting means only when the gate member rotates upon belt withdrawal beyond its latch restrained position.

In another aspect, the invention consists of a pressure-free device for a seat belt wherein the belt is carried on a spool which is rotational in a frame and has biasing means urging spool rotation in a belt retraction direction, comprising:

a gate member having a gate and being movable with respect to both the frame and the spool, a clutch operatively coupling the gate member to be driven by the spool, inhibiting means having at least one abutment face fixed with respect to and thereby rotational along with the spool, an inhibiting member co-operable with said abutment face and movable with respect to the frame and having gate sensing means thereon co-operable with the gate member during movement thereof to be retained by the gate member from engaging the abutment face excepting when traversed by the gate, a gate latch, interengaging surfaces on the gate member and gate latch which when engaged, restrain gate member movement in the direction which corresponds to belt withdrawal, means on the frame guiding the gate latch from movement from a gate engaging position to a gate disengaging position, limit means limiting gate member movement in the opposite direction, and a belt coil sensor movable with respect to the frame in response to the belt coil size on the spool and so coupled to the gate latch as to allow movement of the gate latch to said gate engaging position upon increase of belt coil size.

The abutment face may be a ratchet wheel tooth, and the clutch may conveniently be constituted by a surface between the ratchet wheel carried on the spool and the gate member. The clutch needs to have only a relatively small frictional engagement, and must not be so great as to prevent relative rotation between the gate member and spool under the force imparted by the torsion imparting spring and the spool which is utilised for coiling the belt onto the spool as retraction takes place. Desirably the abutment co-operating member is a pivoted pawl, but any mechanical equivalent thereof can be utilised, and for example the pawl may be a spring loaded finger, or it may be a plunger which is spring loaded towards the ratchet teeth, the plunger being carried in a housing in which it slides. Other mechanical equivalents will be seen to be available for use in this invention. The gate latch may also be a pivoted arm pivoted on a pin outstanding from the frame, and the sensing arm can conveniently be pivoted on the same pin as the gate latch and coupled thereto for example, by means of an abutment surface or by means of a spring, or both. To facilitate easy retraction without the need to necessarily separately effect a manual release, the gate member may be provided with an outstanding release lobe having a ramp face thereon which is arranged to throw the pawl from engagement with the ratchet wheel. If a single disc is used as the gate member directly coupled to the spool, a satisfactory arrangement can be easily achieved with this invention, but with a loss of certain desirable facilities. For example it may become possible upon a wearer leaning forward and then slowly leaning back for the pawl to re-enage the teeth so that a new "pressure free point" is established remote from the body of a wearer and separate release would then be required. However, in some aspects of the invention, this difficulty is overcome by incorporating a speed reduction gear from the spool to the gate member so that the gate member rotates at a lower speed than the spool, or in an even more elaborate embodiment, by utilising two gate discs, one being a primary gate disc and the other being a secondary gate disc, and employing alignment of cam surface recesses to allow the pawl to drop into engagement with the teeth.

BRIEF DESCRIPTION OF THE DRAWINGS

Two embodiments are described hereunder in some detail with reference to and are illustrated in the accompanying drawings, in which:

FIG. 5 is a similar view showing a seventh position, FIG. 6 is an elevational section of a seat belt retractor (dotted lines) incorporating the pressure free device (full lines)

Figure 2:
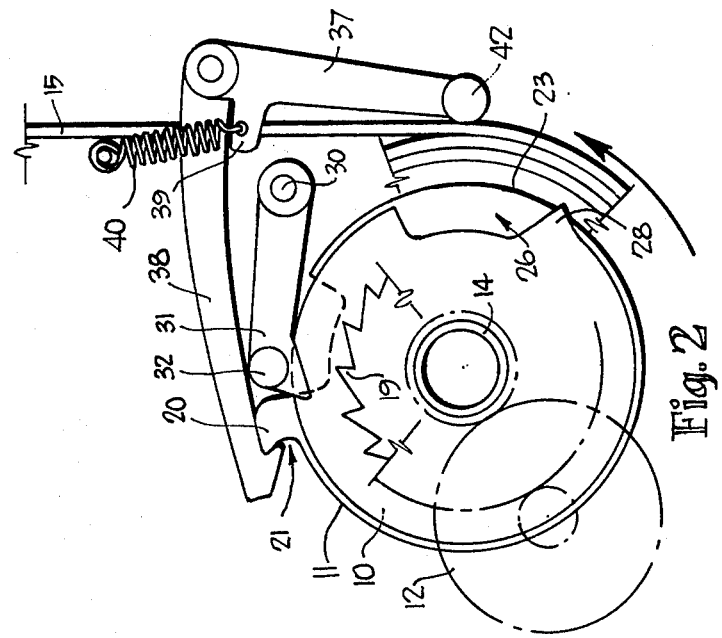
FIG. 2 is a similar view showing a second position.

In the first embodiment which is illustrated in FIGS. 1 to 6 of the accompanying drawings, use is made of two gate members, namely a primary gate disc 10 and a secondary gate disc 11, which is co-axial therewith, there being a gear train 12 between the primary and secondary gate discs so that (fast) rotation of the primary disc 10 effects (slow) rotation of the secondary disc 11 in the same direction.

A spool 13 (FIG. 6) is provided with a hollow shaft 14 and side discs in the ordinary way, and is arranged to receive belt webbing 15 under the effect of a torsion biasing spring (not shown) which causes rotation of the spool thereby retracting the belt onto the spool.

The shaft 14 extends outwardly from one end plate of the spool frame, and the shaft carries on it for free rotation, firstly the secondary gate disc 11, then a Belville spring 18 for imparting an axial thrust against the gate discs, then the primary gate disc 10 outwardly from the secondary gate disc, and finally a ratchet wheel 19 having two rows of teeth, respectively sloping in clockwise and anti-clockwise directions. The teeth which slope in the clockwise direction function in the normal way upon being actuated by inertia sensing means to prevent further withdrawal of the belt from the spool, while the teeth which slope in the opposite direction, (that is which allow a pawl to click over the teeth upon anti-clockwise rotation as shown) constitute retraction inhibiting means, the tooth abutment faces being oriented to prevent retraction. The invention is concerned with this inhibition of retraction which establishes "pressure free" conditions.

The secondary gate disc 11 is provided with a radially outstanding tooth 20 which in turn has an "undercut", or re-entrant gate latch engagement surface 21 sloping forwardly and outwardly in a leading anti-clockwise direction, and the clockwise end of this tooth extends approximately radially inwardly to a recess 22 which forms portion of a secondary cam surface 23 of the disc 11. The primary gate member 10 is also a disc member also having a recess designated 26 which extends inwardly from its periphery 27 constituting therewith a primary cam surface, but one end of the primary recess 26 has an outstanding lobe 28 with a ramp face merging into the remainder of the otherwise circular periphery and which constitutes a release lobe, which throws the pawl to a disengagement position upon rapid retraction.

Figure 4:
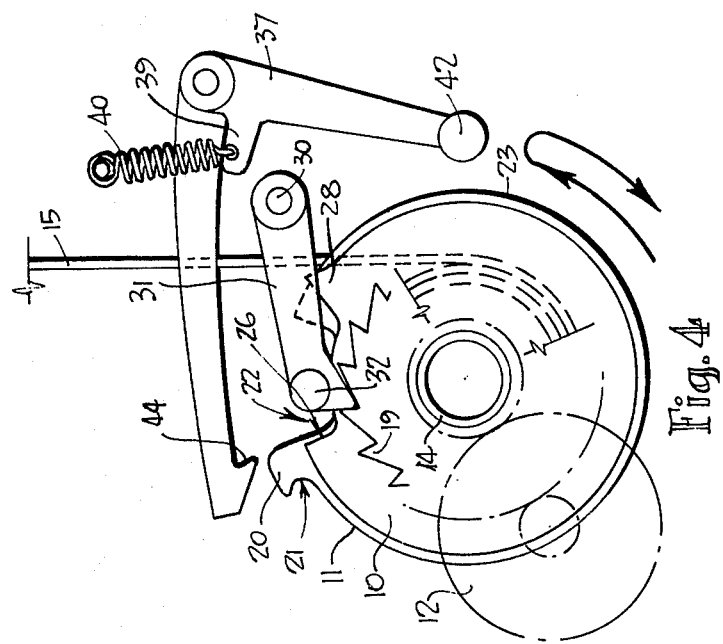
FIG. 4 is a similar view showing a fifth position.
Figure 3:
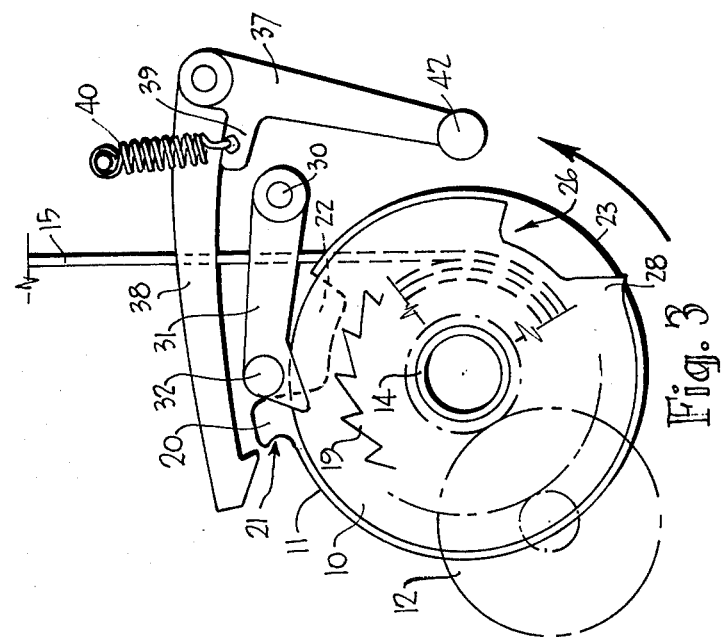
FIG. 3 is a similar view showing a fourth position.

A pivot pin 30 is secured to the frame end wall to be outstanding therefrom and the pawl (designated 31) is pivoted on the pin 30, the pawl 31 being actuated either by gravity or by means of a light spring (not shown). The pawl 31 when released is engageable with the abutment face of a tooth of ratchet wheel 19 to prevent retraction. However, release of the pawl 31 is controlled by the gate member cam surfaces, since the pawl has an axially extending finger 32 which rides over the peripheral cam surfaces 27 and 23 of the primary and secondary gates, preventing the pawl from dropping into engagement with the ratchet teeth until such time as the gates in the two gate members align with the extending finger of the pawl as shown in FIG. 4, whereupon the pawl is free to drop pending lifting of the pawl from the teeth by an end wall of a gate recess upon still further rotation.

The two side plates of the spool frame 36 have pivoted between them a pivotal arm 37 which constitutes a sensing arm, the sensing arm being pivotal about the same axis as a gate latch 38. The sensing arm 37 is provided with an abutment projection 39 extending outwardly and arranged to engage beneath the undersurface of the gate latch 38 so that clockwise movement of the sensing arm 37 will result in lifting of the gate latch 38. The latch 38 is urged towards a lifting position by means of a spring 40 coupled to the abutment 39 and also to the frame 36, but the sensing arm 37 is provided with an axially extending finger 42 which engages against the outer surface of the coil of belt webbing 15 contained on the spool 13. It follows therefore that additional webbing on the spool will rotate the sensing arm about its pivotal axis in an anticlockwise direction, thus causing the gate latch to engage the gate member when the belt is retracted. The swinging or outer end of the gate latch is provided with an undercut notch, and one of the notch surfaces is designated 44 and cooperates with the gate latch engagement surface 21 of the tooth 20 outstanding from the secondary disc 11 to prevent lifting of the gate latch 38 until there is some retraction of the belt causing clockwise movement of the secondary gate disc.

Between the primary and secondary gate discs the gear train 12 drives the secondary gate disc 11 at 1/10th the rotational velocity of the primary gate disc 10, which is driven at the same rotational velocity as the spool by the frictional clutch surfaces designated 45 in FIG. 6.

Figure 1:
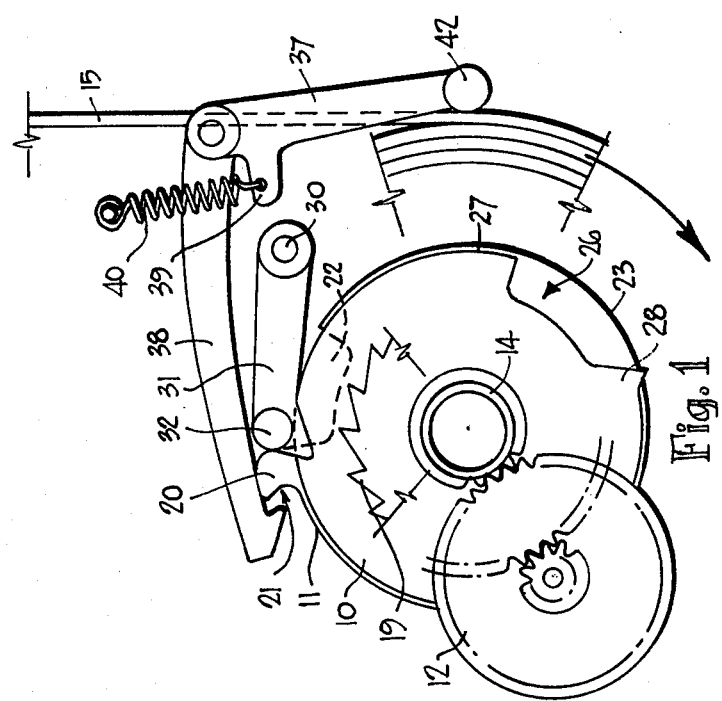
FIG. 1 is a diagrammatic end elevation of a first embodiment showing the pressure free device in a first position.

In operation, when the belt webbing is stowed, it has been stowed due to what is herein described as a clockwise rotation of the spool, the large coil size engaging the sensing arm finger 42 and causing the sensing arm to swing in an anti-clockwise direction thus allowing the gate latch 38 to lie against the tooth of the secondary gate as shown in FIG. 1. Rotation of the secondary gate disc 11 anticlockwise is therefore restrained by the latch 38.

The second stage or position is effected when extraction commences as illustrated in FIG. 2, the secondary gate disc 11 being rotated anti-clockwise a short distance so that the tooth 20 engages the re-entrant (undercut) notch surface 44 of the gate latch 38 and prevents further anti-clockwise rotation of the secondary disc 11. The sensing arm follows the diminishing diameter of the coil on the spool, and the pawl 31 remains out of engagement from the teeth of the ratchet wheel 19 by the gate disc 10 peripheral cam surface.

The third position is not illustrated, but after further webbing has been withdrawn from the spool, wherein the abutment projection 39 on the sensing arm prevents the sensing arm from swinging inwardly in clockwise direction, and therefore contact between the sensing arm and the webbing coil is lost. In the fourth position illustrated in FIG. 3, the webbing has been withdrawn sufficiently for the user to close the buckle and the slight retraction as the belt moves back to the body of the wearer results in a slight clockwise movement of the two gate discs 10 and 11, causing the undercut gate latch engagement surface 21 of the tooth 20 of the secondary gate disc to move away from the co-operating notch surface 44 of the gate latch 38, so that the gate latch is now free to be drawn by the spring 40 upwardly away from the gate tooth. The next position shown in FIG. 4 is a position of engagement of the pawl 31 with a tooth of ratchet wheel 19, and this is achieved when there is sufficient rotation of the two gate discs 10 and 11 for the recesses 26 and 22 to align so that the pawl 31 is free to drop into and engage a ratchet tooth. The sixth position is not illustrated, but is a position wherein the further rotation caused by further withdrawal of the belt from the spool (causing anticlockwise rotation) clicks the pawl over the ratchet wheel teeth until the pawl is finally lifted by running up the ramp portion of the cam face of the primary disc recess 26, and is retained in its release position by engagement with the periphery of the secondary gate disc. This is a situation which exists when the wearer moves forwardly from his seat back.

The seventh position illustrated in FIG. 5 is similar to the sixth position and indicates still further withdrawal, which can take place for nine full rotations of the primary disc (and therefore the spool) before further rotation is inhibited by the tooth of the secondary disc, because of the gear relationship between the two discs. This corresponds to a very considerable forward movement of the occupant, but is against the bias tension of the spool spring. Retraction will occur until the gate recesses 26 and 22 once again align and allow the pawl to engage a ratchet wheel tooth at the previously established "pressure free" position.

The final situation to be considered is the situation which exists upon rapid retraction, whereupon the primary gate disc lobe throws the pawl outwardly away from the ratchet and continued movement takes place before the pawl has time to drop into engagement with the ratchet. This then cancels the pressure-free condition but the pressure-free condition can be reinstated at any time. In this embodiment there is also provided (but not illustrated) an actuating rod coupled to the pawl so that the pawl can be lifted out by external means, for example by a seat sensing means, door sensing means or by a hand controlled knob.

From the above description it will be clear that a "pressure sensing point" is established after the seat belt has been drawn back to the body of a wearer and then is moved forward by a small amount so that the wearer is not subjected to the continuous bias which is caused by the torque imparting spring of the seat belt retractor and that this pressure-free position will be maintained irrespective of extreme forward excursions of the wearer. It is also clear that upon retraction of the belt to the stowing position, the pressure-free point will be cancelled due to displacement of arm 37 and that a new pressure-free point will be automatically established to suit the size and seating position of the next belt wearer.

Figure 7:
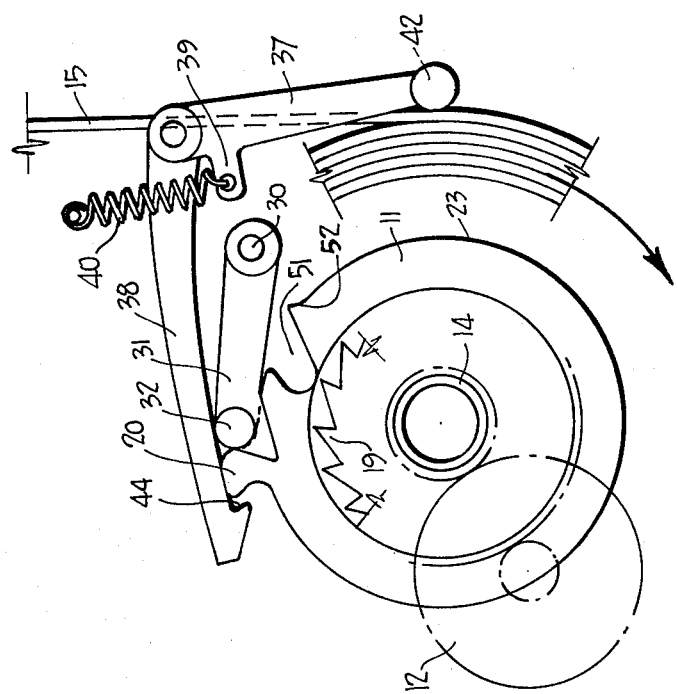
FIG. 7 is a view corresponding to FIG. 1, but of a second embodiment where only one gate member is utilised, (not two as in the first embodiment).

The above embodiment was described with respect to a pair of gate discs, but as said above, the invention may also be utilised with a single gate disc, and a second embodiment is illustrated in FIG. 7. In most respects the second embodiment is similar to that described above and similar elements have similar designations, but there is no primary gate disc and the secondary gate disc (which now becomes the only gate disc) is provided with a relatively narrow slot 51 the clockwise end of which extends into the release lobe 52 of the disc which is spaced radially outwardly more than the rest of the periphery (other of course than the tooth) and functions to throw out the pawl 31 upon rapid rotation so that the pawl is retained out of engagement from the ratchet wheel teeth upon rapid retraction of the belt. The clutch surface may be between a pinion on the shaft and the ratchet wheel; it may be between a gear and pinion on the counter shaft; or it may be between the driven gear on the gate disc and the gate disc itself.

If desired, the gate latch may be provided, not with an undercut notch, but can extend to the tooth from the opposite direction. The spring between the gate latch and the sensing arm may be a flat helical spring with arms thereon engaging the latch and arm respectively. The gate member can be a sliding member. The gate can be a spring lobe, but of course must have a cam surface thereon. The belt coil sensor can be operated by a geared cam, rotating at a reduced rotational velocity. The pawl and ratchet arrangement may be a one-way clutch.

Various modifications in structure and function may be made to the disclosed embodiments by one skilled in the art without departing from the scope of the invention as defined by the claims.

I claim:

1. A pressure free device for a seat belt wherein the belt is carried on a spool which is rotational in a frame and has biasing means urging spool rotation in a belt retraction direction, comprising:

retraction inhibiting means coupled to the spool, and
a retraction inhibiting member movable with respect to the frame and releasably engageable with said inhibiting means to inhibit said rotation in the belt retraction direction, a gate latch movable with respect to the frame, a gate member mounted for rotation with respect to the frame and clutch means coupling said gate member to said spool, and having associated therewith both a cam surface engaged by said inhibiting member, and a gate latch engagement surface engageable by said gate latch to restrain gate member rotation in a latch restrained position upon belt withdrawal, and gate latch release means operable to release said latch from its engagement with said engagement surface when the gate member rotates upon belt retraction, said cam surface controlling said inhibiting member to engage said inhibiting means only when the gate member rotates upon belt withdrawal beyond its latch restrained position.

2. A pressure free device according to claim 1 wherein said inhibiting means coupled to the spool is the ratchet wheel, and said inhibiting member is a pawl, the device further comprising pivot means pivotally mounting the pawl to the frame, the ratchet wheel having teeth so oriented that, when engaged by the pawl, spool rotation in a belt retraction direction is restrained.

3. A pressure free device according to claim 2 further comprising a tooth outstanding from the gate member, said cam surface being a surface of the gate member and said gate latch engagement surface being a surface of said tooth.

4. A pressure free device according to claim 2 further comprising a pivotal mounting on the spool frame mounting the gate latch for pivotal movement and wherein said gate latch release means comprises a spring co-acting between the gate latch and the frame to draw said gate latch out of engagement from said gate latch engagement surface.

5. A pressure free device for a seat belt wherein the belt is carried on a spool which is rotational in a frame and has biasing means urging spool rotation in a belt retraction direction, comprising:

a gate member being movable with respect to both the frame and the spool, a clutch operatively coupling the gate member to be driven by the spool, inhibiting means having at least one abutment face fixed with respect to and thereby rotational along with the spool, a cam surface on the gate member, a recess in said cam surface forming a gate, an inhibiting member co-operable with said abutment face and movable with respect to the frame and having gate sensing means thereon co-operable with the cam surface on the gate member during movement thereof to be retained by the gate member from engaging the abutment face excepting when traversed by the recess, a gate latch, interengaging surfaces on the gate member and gate latch which when engaged, restrain gate member movement in the direction which corresponds to belt withdrawl, means on the frame guiding the gate latch for movement from a gate engaging position to a gate disengaging position, and a belt coil sensor movable with respect to the frame in response to the belt coil size on the spool and so coupled to the gate latch as to allow movement of the gate latch to said gate engaging position upon increase of belt coil size.

6. A pressure free device according to claim 5 wherein said belt coil sensor comprises an arm having outstanding therefrom an abutment projection engageable against said gate latch, a pivotal mounting on the frame mounting the arm for pivotal movement, and a spring coupled at one end to the arm and at its other end to the frame to urge the sensor into engagement with the belt coil on the spool, the arm being pivotally movable to lift the gate latch from its gate engaging position only when coil size is diminished by belt withdrawal.

7. A pressure free device according to claim 6 wherein said pivotal mounting is also a pivotal mounting for said gate latch, the swinging end of said gate latch having a finger thereon with a re-entrant notch surface, the gate member being a discoid member with an outstanding tooth thereon, said tooth also having a re-entrant surface which is a latch engagement surface, said gate latch being restrained by interengagement of said re-entrant finger and tooth surfaces during belt withdrawal and said arm pivotal movement occurs only when retraction movement subsequent to withdrawal retracts said tooth from said gate latch notch surface.

8. A pressure free device according to claim 5 wherein there are two said gate members, one being a primary gate member and the other a secondary gate member, both co-axial with said spool, said spool being on a spool shaft journalled for rotation in the frame, said inhibiting means being a ratchet wheel on the spool shaft having its teeth oriented to inhibit rotation in the belt retraction direction of spool rotation, said inhibiting member being a pawl pivoted to the frame and releasably engageable with the ratchet teeth, said clutch being constituted by co-acting surfaces between the ratchet wheel and the primary gate member, a gear train coupling the primary gate member with the secondary gate member for causing rotation of the secondary gate member in the same direction as but at a lower speed than the primary gate member, said gate latch being on an arm pivoted to the frame and having on its swinging end a finger with a re-entrant notch surface, said secondary gate member having an outstanding tooth thereon also with a re-entrant surface engageable by said latch arm re-entrant notch surface to retain said latch arm is engagement therewith during belt withdrawal thereby inhibiting belt coil sensor movement, but being releasable upon retraction rotation after said withdrawal whereby said belt coil sensor lifts the gate latch to an inoperative position, both said gate members having peripheral cam surfaces engaged by the pawl, and each having a recess therein such that upon spool rotation caused by further belt withdrawal after said gate latch release and movement to its inoperative position, said recesses align allowing said pawl to move into engagement with a tooth of said ratchet wheel and thereby inhibits retraction.

9. A pressure free device according to claim 8 wherein said primary gate member has a release lobe at one end of its said recess, operable to throw said pawl away from said ratchet wheel upon rapid retraction.

10. A pressure free device for a seat belt wherein the belt is carried on a spool which is rotational in a frame and has biasing means urging spool rotation in a belt retraction direction, comprising:

retraction inhibiting means coupled to the spool, and a retraction inhibiting member movable with respect to the frame and releaseably engageable with said retraction inhibiting means to inhibit rotation in the belt retraction direction, a gate latch movable with respect to the frame, a gate member movable with respect to the frame and clutch means coupling said gate member to said spool, the gate member having associated therewith a retraction inhibiting member control surface means engageable with said inhibiting member to control inhibiting member movement, and means on said gate member for engaging said gate latch to restrain movement of said gate member during belt withdrawal, whereby when withdrawal of the belt has caused the gate latch to engage the gate member to restrain gate member movement and initial retraction of the belt releases the gate latch from the gate member, further belt withdrawal allows the retraction inhibiting member to inhibit rotation of said spool in the belt retraction direction by said surface means.

11. A pressure free device according to claim 10 wherein said engaging means comprises a gate latch engagement surface engageable by the gate latch to restrain gate member motion in a latch restrained position upon belt withdrawal, and gate latch release means operable to release the gate latch from its engagement with the engagement surface when the gate member moves upon belt retraction, said retraction inhibiting member control surface means controlling said inhibiting member to engage the retraction inhibiting means to prevent continued belt retraction only when the gate member moves upon belt retraction following withdrawal beyond its latch restrained position.

12. A pressure free device according to claim 10 wherein the retraction inhibiting means is a toothed ratchet wheel and the retraction inhibiting member is a pawl.

13. A pressure free device according to claim 12 comprising means for mounting the pawl to the frame, the ratchet wheel having teeth so oriented that, when engaged by the pawl, spool rotation in the belt retraction direction is restrained.

14. A pressure free device according to claim 11 wherein the retraction inhibiting member control surface means is a surface of the gate member and the gate latch engagement surface is a surface of a tooth outstanding from the gate member.

15. A pressure free device according to claim 11 wherein the gate latch release means is means co-acting between the gate latch and the frame.

* * * * *